H. CLEMM AND C. HANGLEITER.
PROCESS FOR THE RECUPERATION OF THE SULPHUROUS ACID AND HEAT FROM WASTE GASES COMING FROM BOILERS FOR CELLULOSE.
APPLICATION FILED MAR. 2, 1921.
1,429,128.  Patented Sept. 12, 1922.
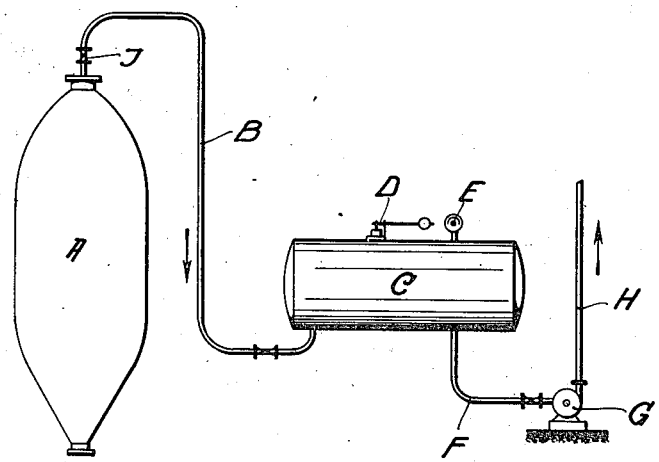
Inventors
Hans Clemm
Carl Hangleiter
By Davis & Davis Patented Sept. 12, 1922.

1,429,128

UNITED STATES PATENT OFFICE.

HANS CLEMM AND CARL HANGLEITER, OF MANNHEIM-WALDHOF, GERMANY, ASSIGNORS TO ZELLSTOFFFABRIK WALDHOF, OF MANNHEIM-WALDHOF, GERMANY, A CORPORATION OF GERMANY.

PROCESS FOR THE RECUPERATION OF THE SULPHUROUS ACID AND HEAT FROM WASTE GASES COMING FROM BOILERS FOR CELLULOSE.

Application filed March 2, 1921. Serial No. 449,264.

*To all whom it may concern:*

Be it known that we, HANS CLEMM and CARL HANGLEITER, citizens of the German Republic, residing at Mannheim-Waldhof, Germany, have invented certain new and useful improvements in a process for the recuperation of the sulphurous acid and heat from waste gases coming from boilers for cellulose, of which the following is a specification, reference being had to the accompanying one sheet of drawing, which is a diagram of an apparatus for carrying out our process.

Various methods have been used for recuperating the sulphurous acid and the heat which come from boilers for cellulose when the waste gases are being let off (for example the comparison in the "Wochenblatt für Papier-fabrikation 1916, page 2139 and sequels. The principal consideration was always, as can also be seen from the comparison cited, to ensure the most complete recuperation of the $SO_2$ for which reason the procedure was carried through always with extensive cooling of the gases, steam and solutions used for the forcing over the heat being given up to the cooling water which is led to a warm water receptacle; a process which is evidently accompanied with considerable loss of heat. The sulphurous acid is also most entirely recuperated only because the parts of the gas which had not been absorbed in the absorber were sent again into a brine tower or because, at the side of the brine towers, a separate absorber tower was erected (as described in example 5 of the treatise mentioned), said absorber tower being loaded with fresh solution. These procedures are both very troublesome and they complicate the manufacturing process. It has further been tried to separate the solution used for forcing over, whilst it would have been more correct to reduce the quantity of the solutions for forcing over so that they could be admitted to the fresh solution together with the waste gases. With the methods hitherto employed care had to be taken that the fresh solution was not excessively heated by the waste gases (in some cases to approximately 50—60°), as considerable loss of sulphurous acid would thus be caused, whereby the boiling would be injured (which is the case already at over 30°). Owing to this, the boiler which was still hot from the preceding boiling, would always be more or less cooled when fresh solutions was let in. From all this it can be seen that the problem, to recuperate simultaneously and almost completely the sulphurous acid and the heat of the waste gases, was not solved by the known working methods.

We have discovered that the heat as well as the $SO_2$ can be recuperated from waste gases practically almost completely in a very simple manner by conducting the flowing over medii without cooling directly into the fresh solution contained in a closed vessel. The overflow conduits are preferably well heated to avoid as much as possible the cooling of the fluids. As long as the fresh solution, into which the waste gases and the like are conducted, is still of low temperature, the sulphurous acid is completely absorbed. When the temperature increases the solution will give up some sulphurous acid to the gas chamber situated at the top. As the vessel is closed a corresponding pressure is thus produced in the same which increases the capacity of the solution to absorb sulphurous acid, the escaping of such sulphurous acid being absolutely prevented.

It has been found that in this manner fresh solution can be heated by the waste gases and the like to a temperature of 90° C and more, the pressure over atmospheric which is produced remaining always considerably below the pressure in the boiler from which the gases are forced over.

Whilst with the methods hitherto employed the heat was recuperated only partially, the sulphurous acid being recuperated almost completely in a very troublesome manner only, the entire heat and all the sulphurous acid is recuperated according to the improved process and both are used for the advantage of the boiling solution. A fresh solution of approximately 90° C. and more can be obtained, this temperature corresponding approximately to the temperature of a boiler which has just been emptied and not yet been cooled by rinsing, so that this boiler is scarcely cooled when it is filled with fresh solution. This process presents further the great advantage with direct boiling that owing to the high temperature of the fresh solution, only very little steam is condensed when the boiling begins so that it is possible to begin the boiling with a much weaker solution than has hitherto been possible according to the former method in which the fresh solution was considerably diluted by the condensed steam.

The novel process can be executed in the simplest manner and it does not require any complicated apparatus. The fresh solution is supplied to a vessel lined with lead which can withstand the required pressure over atmospheric (a boiler for cellulose can be well used for this purpose), whereupon the vessel is closed, the hot waste gases and steam (together with the forcing over solutions if there are any) being introduced into the solution through a pipe mounted in the bottom of the boiler and connected with the conduit for the waste gases, until the solution has reached the desired temperature and is sufficiently saturated with sulphuric acid. The solution can be transferred directly into a boiler charged with wood.

Referring to the annexed drawing, the process is carried out in the following manner:

The boiling of the cellulose material takes place within the boiler A, the pressure vessel C being filled with fresh lye. The boiling finished, the hot gases and vapors are led, by opening the valve J, through the pipe B into the pressure vessel C where they are absorbed by the lye. (In the same way it is proceeded when the waste gases are to be blown off before the boiling is finished.) By this step the lye is heated at the same time. But an escape of sulphurous acid gases by this heating can not take place, as the vessel C is closed in such a manner that by the gases introduced and the heating gradually a pressure is created, the height of which may be read from a manometer E. This pressure may be adjusted within certain limits to a maximal degree, as, for instance, by a safety-valve D. The heated lye enriched with sulphurous acid is then taken out of the vessel C and brought to another place for any further treatment by means of the pump G and pipes F and H. The vessel C may be of any suitable shape; for instance, a boiler of the shape of boiler A may be used as the pressure vessel.

We claim:

An improved process for the recuperation of sulphurous acid and heat from the waste gases of boilers for cellulose, in which the forced over steam and solution is directly introduced, without previous cooling, into the fresh solution, which is contained in a closed pressure vessel.

In testimony whereof we affix our signatures in presence of two witnesses.

Dr. HANS CLEMM,
CARL HANGLEITER.

Witnesses:
R. Hurl,
Julius Nurtruje.